United States Patent
Nordenskjöld (10) Patent No.: US 7,142,899 B2
(45) Date of Patent: Nov. 28, 2006

(54) PORTABLE ELECTRONIC DEVICES HAVING A LOCKING MECHANISM FOR HOLDING AND RELEASING A FLIPPING SECTION

(75) Inventor: Kjell Nordenskjöld, Stockholm (SE)

(73) Assignee: Sony Ericsson Mobile Communications AB, Lund (SE)

( * ) Notice: Subject to any disclaimer, the term of this patent is extended or adjusted under 35 U.S.C. 154(b) by 109 days.

(21) Appl. No.: 10/938,108

(22) Filed: Sep. 10, 2004

(65) Prior Publication Data
US 2005/0059442 A1 Mar. 17, 2005

Related U.S. Application Data

(60) Provisional application No. 60/504,103, filed on Sep. 19, 2003.

(30) Foreign Application Priority Data
Sep. 11, 2003 (EP) ................... 03020683

(51) Int. Cl.
*H04M 1/00* (2006.01)
(52) U.S. Cl. ................ 455/575.3; 455/575.1; 455/550.1
(58) Field of Classification Search ............ 455/550.1, 455/575.1, 575.3
See application file for complete search history.

(56) References Cited

U.S. PATENT DOCUMENTS 5,761,300 A 6/1998 Domoleczny ............... 379/433
6,123,401 A 9/2000 Chiba et al. ................ 312/328
6,256,481 B1 7/2001 Jeong et al. ................. 455/90
6,430,400 B1 * 8/2002 MacDonald et al. ....... 455/90.1
6,438,228 B1 * 8/2002 Jeong et al. ........... 379/433.13
2002/0039890 A1 * 4/2002 Kim ........................... 455/90

FOREIGN PATENT DOCUMENTS

EP  1 307 031 A2  5/2002

OTHER PUBLICATIONS

European Search Report and Opinion related to EP 03030683 mailed Feb. 4, 2004.

* cited by examiner

*Primary Examiner*—Temica Beamer
(74) *Attorney, Agent, or Firm*—Myers Bigel Sibley & Sajovec, PA (57) ABSTRACT

A portable electronic device includes a main section with electronic circuitry. A detachable flipping section is foldably mounted around an axis of rotation relative to said main section such that the flipping section can be folded in a first position. The flipping section is detachable and reattachable. A locking mechanism is provided with a resilient member, the resilient member being configured such that it orients, by action of the resilience of said member, the flipping section in a second position, the locking mechanism being further configured to prevent the flipping section from being detached from the main section within a position range comprising the second position.

11 Claims, 9 Drawing Sheets

PORTABLE ELECTRONIC DEVICES HAVING A LOCKING MECHANISM FOR HOLDING AND RELEASING A FLIPPING SECTION

RELATED APPLICATIONS

This application claims the benefit of and priority to European Patent Application No. 03020683.3, filed Sep. 11, 2003, and U.S. Provisional Application No. 60/504,103, filed Sep. 19, 2003, the disclosures of which are hereby incorporated herein by reference as if set forth in their entireties.

BACKGROUND OF THE INVENTION

The present invention relates to a locking mechanism. More particularly it relates to a locking mechanism for holding and/or releasing a flipping section foldably mounted to a main section of a portable electronic device.

To provide a cover for parts of portable electronic devices, such as mobile phones, some mobile phones are equipped with a cover that is foldable onto typically the upper part of the phone. This cover or flipping section can comprise a key-pad or other functionality. However, some applications do not gain from this cover and rather this cover can be an obstacle for gaming and PDA-associated applications. Therefore, these covers are therefore provided to be detachable from the mobile phone.

In reality this detaching of the cover or flipping section is often more easily said than done and if at all possible this operation requires a considerable amount of effort, which in reality prevents the user from detaching the cover. Having this cover continuously mounted on the mobile phone therefore limits the usability and versatility of said mobile phone.

SUMMARY OF THE INVENTION

According to some embodiments of the present invention, a portable electronic device includes a main section with electronic circuitry. A detachable flipping section is foldably mounted around an axis of rotation relative to said main section such that the flipping section can be folded in a first position. The flipping section is detachable and reattachable. A locking mechanism is provided with a resilient member, the resilient member being configured such that it orients, by action of the resilience of said member, the flipping section in a second position, the locking mechanism being further configured to prevent the flipping section from being detached from the main section within a position range comprising the second position.

Advantageously, the flipping section is detachable from and reattachable to the main section and the flipping section is folded such that it is prevented from being detached from the main section.

In other embodiments of the present invention, the locking mechanism further comprises a first locking combination comprising a first recess in the flipping section and a corresponding first tap in the main section, and a second locking combination comprising a second recess in the main section and a second corresponding tap in the flipping section, wherein the resilient member acts on at least one of said two locking combinations.

In still other embodiments of the present invention, the recess of the first locking combination and the recess of the second locking combination are anti-parallel relative to each other in the first position, and at least one tap or recess includes a track, with which the resilient member is arranged to mate, to provide the flipping section in the second position.

In still other embodiments of the present invention, in the first position, the recesses are at least partially provided in a plane that comprises the axis of rotation around which the flipping section is foldable relative to the main section.

In still other embodiments of the present invention, the resilient member is provided in the main section.

In still other embodiments of the present invention, the track is provided in said second tap.

In still other embodiments of the present invention, the flipping section can be folded in a third position, in which the resilient member, by action of its resilience, urges the flipping section to cover at least part of the main section.

In still other embodiments of the present invention, the resilient member is a plate spring.

In still other embodiments of the present invention, the plate spring is made of a metal.

In still other embodiments of the present invention, the metal is spring steel.

In still other embodiments of the present invention, the plate spring is made of plastics.

In further embodiments of the present invention, a locking mechanism for holding and releasing a flipping section and a main section of a portable electronic device, the flipping section being detachably attached to a main section having electronic circuitry, the detachable flipping section being foldably mounted around an axis of rotation relative to said main section such that the flipping section can be folded in a first position wherein the flipping section is detachable and reattachable, the locking mechanism comprises a resilient member. The resilient member is configured such that it orients, by action of the resilience of said member, the flipping section in a second position, the locking mechanism being further configured to prevent the flipping section from being detached from the main section within a position range comprising the second position.

Embodiments of the present invention may provide functionality in a portable electronic device through which a flipping section is easily detachable from and reattachable to said portable electronic device, which functionality further enables the flipping section to be securely attached to a main section of the portable electronic device in normal use. This is achieved by providing locking functionality with which a flipping section is held or is released relative to a main section of a portable electronic device, dependent on the foldable position of the flipping section relative to said main section. The flipping section is safely attached to the main section by a locking mechanism, unless mild force is applied by a user, upon detaching the flipping section from the main section. The locking mechanism has relatively few moving parts, and is, therefore, relatively cheap, simple, and requires little space.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. As used herein, the term "and/or" includes any and all combinations of one or more of the associated listed items.

The present invention relates to the provision of a locking mechanism for the usage in a portable electronic device. In the following the portable electronic device will be described in relation to a mobile phone or mobile terminal. However it should be realized that it can be any one of a variety of devices like a personal digital assistant (PDA), a portable phone, a game box of any kind etc. Moreover, as used herein, the term "mobile phone or mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Figure 1:
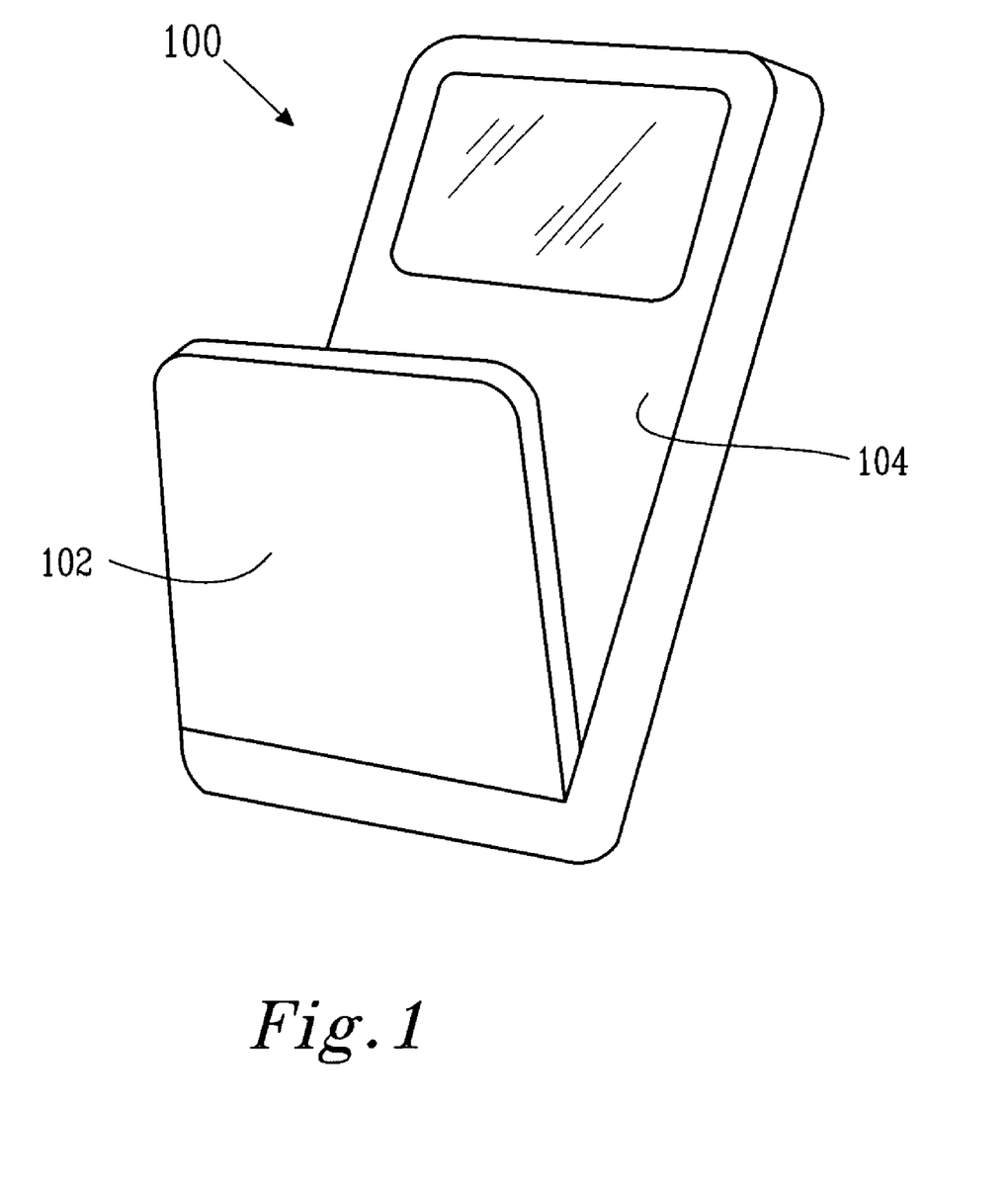
FIG. 1 is a perspective view of a portable electronic device in a semi-open state according to some embodiments of the present invention.

Reference will now be given to FIG. 1 schematically showing a portable electronic device 100 equipped with a flipping section 102, according to some embodiments of the invention. In this figure the portable electronic device 100, being in a semi-open state, comprises a first or flipping section 102, and a second or main section 104, which flipping section 102, is mounted foldably around an axis of rotation relative to the main section.

Figure 2:
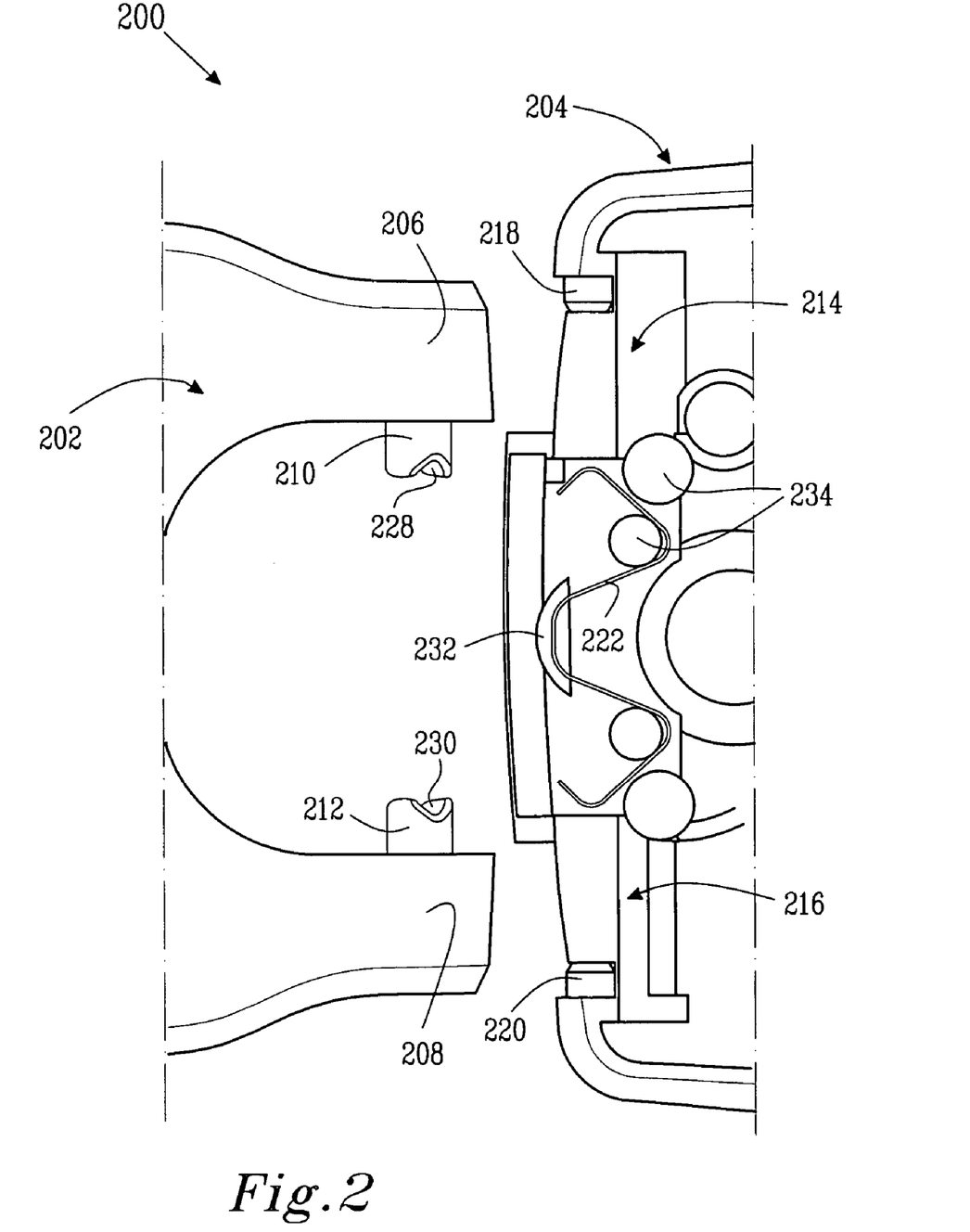
FIG. 2 is a view from below of a locking mechanism of a portable electronic device, having the flipping section detached from the main section of the portable electronic device according to some embodiments of the present invention.

FIG. 2 shows a bottom view of a locking mechanism of a portable electronic device, 200, wherein the flipping section 202, is shown detached from the main section 204. The flipping section 202, is here provided with a first and a second locking arm 206 and 208, respectively. The first and second locking arm 206 and 208, is further provided with a first and second inner tap 210 and 212, respectively.

The main section 204, shown from below, is provided with a first and a second locking arm-receiving area 214 and 216 that further is provided with a first and a second outer tap 218 and 220, respectively. The locking arm-receiving area 214 and 216 is also provided with a first and a second inner groove or recess (not shown) arranged to mate the first and second inner taps 210 and 212 of the flipping section, 202. Similarly, the flipping section is further provided with a first and a second outer groove or recess (not shown) arranged to mate the first and the second outer tap 218 and 220, respectively, in the first and the second locking arm-receiving area 214 and 216, respectively, of the main section. The main section is also equipped with a plate spring 222, oriented to meet the first and second locking arm 206 and 208, in the first and second locking arm-receiving area 214 and 216, respectively. The main section 204 is further provided with plate spring biasing means 232 and 234, which are arranged to hold and orient the plate spring 222, in a proper position for enabling mating the first and second inner taps 210 and 212.

In the same figure, FIG. 2, it is seen that the first inner tap 210 of the flipping section 202, is provided with a recessing track 228, and the second inner tap 212, is provided with a recessing track 230. These recessing tracks are provided in the flipping section 202 in order for the plate spring 222, as provided in the main section 204, to actuate the position of the foldable flipping section 202 whenever the flipping section 202 is attached to the main section 204. This actuation is explained in more detail below.

The inner and outer taps 210 and 212, and 218 and 220, respectively, as shown in FIG. 2 may be circular in shape in accordance with some embodiments of the present invention. However, any semi-circular or even non-circular shape is just as well applicable in other embodiments of this invention.

Figure 3:
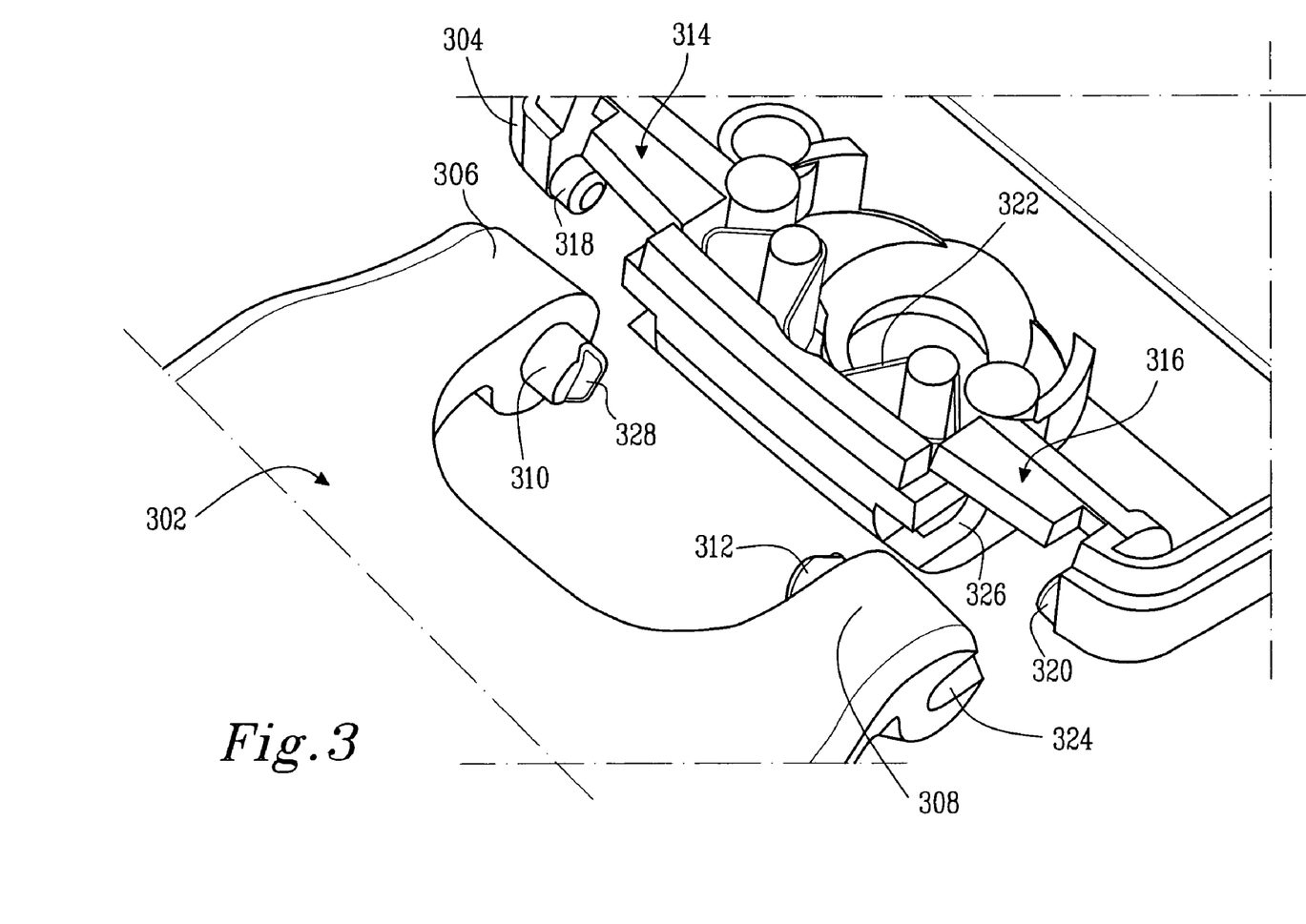
FIG. 3 is a perspective view from below of the locking mechanism of a portable electronic device, showing the flipping section detached from the main section according to some embodiments of the present invention.

FIG. 3 is a perspective view from below the locking mechanism of a portable electronic device having the flipping section 302 detached from the main section 304. This figure visualizes the elements of the locking mechanism comprised in each one of the first and the second locking arms 306 and 308, and also each one of the first and second locking-arm receiving areas 314 and 316, respectively.

Functional features of the locking mechanism, according to some embodiments of the present invention, will now be described. In the second locking arm 308 of the flipping section 302, there is provided one outer groove or recess 324, on the outer side of said second locking arm 308, and in the corresponding locking arm-receiving area 316, on one side thereof, there is provided an inner groove or recess 326. These grooves are each provided to meet a corresponding tap in the locking mechanism. The outer groove 324 in the locking arm 308 is formed for mating with the outer tap 320 in the locking arm-receiving area 316, and the inner groove 326 in the locking arm-receiving area 316 is formed for mating with the inner tap 312 of the locking arm 308.

The inner taps provided on the flipping section 302, that is the first inner tap 310 and the second inner tap 312, are provided with a first and second recessing track, 328 and 330, respectively, as described in relation to FIG. 2. These recessing tracks 328 and 330 are provided such that they form an angle to each of the two ends of the plate spring 322 when the flipping section 302 is folded in the first position. There is hence a non-alignment of the ends of the plate spring 322 and the recessing tracks 328 and 330.

With the foldable flipping section in a position in which the flipping section is detachable from and reattachable to the main section of the portable electronic device, the outer groove 324 of the flipping section 302 is directed anti-parallel as compared to the inner groove 326 of the main section 304. In this position of the foldable flipping section 302 relative to the main section 304, the inner tap 312 of the flipping section 302 meets the inner groove 326, of the main section 304 and the outer tap 320, of the main section 304 meets the outer groove 324 of the flipping section 302 upon attaching a detached flipping section 302 onto the main section 304. This position in which the flipping section 302 is detachable from and reattachable to the main section 304 is in this invention called the first position.

Figure 4:
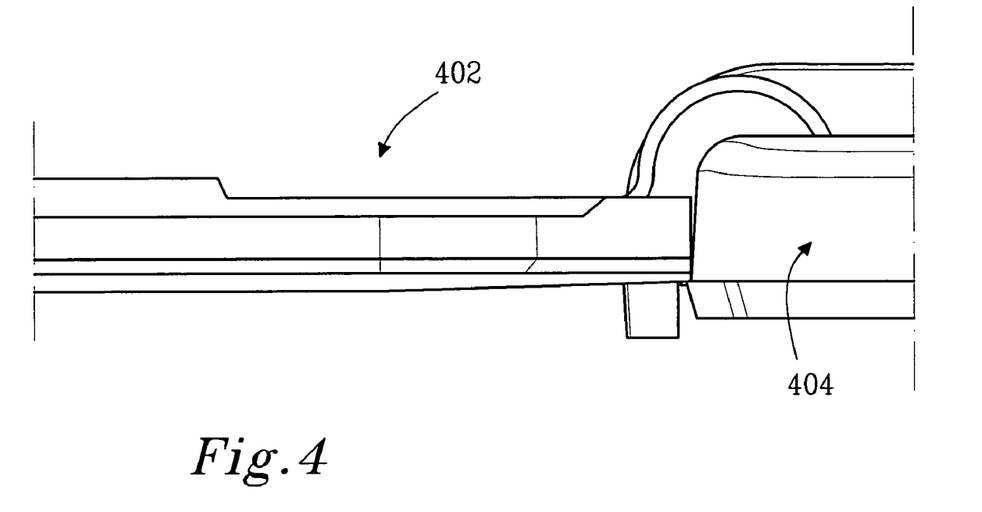
FIG. 4 is a side view of the locking mechanism of a portable electronic device with the flipping section attached to the main section with the flipping section folded in a first position according to some embodiments of the present invention.

FIG. 4 shows a side view of the locking mechanism of a portable electronic device, according to some embodiments of the present invention, with the flipping section 402 attached to the main section 404 and the flipping section 402 folded into the first position, in which the flipping section 402 is detachable from and reattachable to the main section 404.

Figure 5:
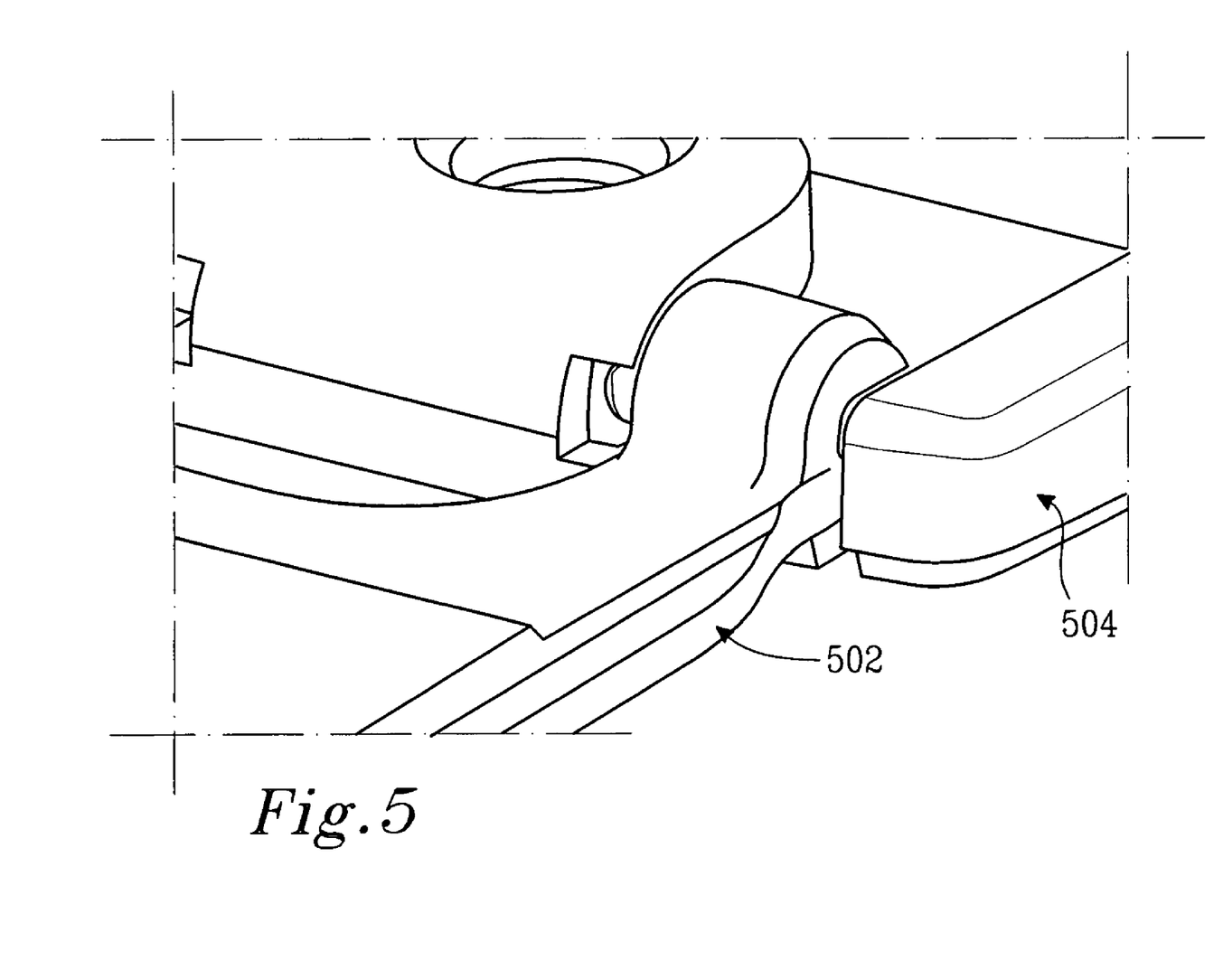
FIG. 5 is a perspective top-side view of the locking mechanism of a portable electronic device with the flipping section in the first position according to some embodiments of the present invention.

FIG. 5 is a perspective side-top view of the locking mechanism of a portable electronic device, according to some embodiments of the present invention, having the flipping section 502 folded in the first position. This position is the same as the one of FIG. 4.

Figure 6:
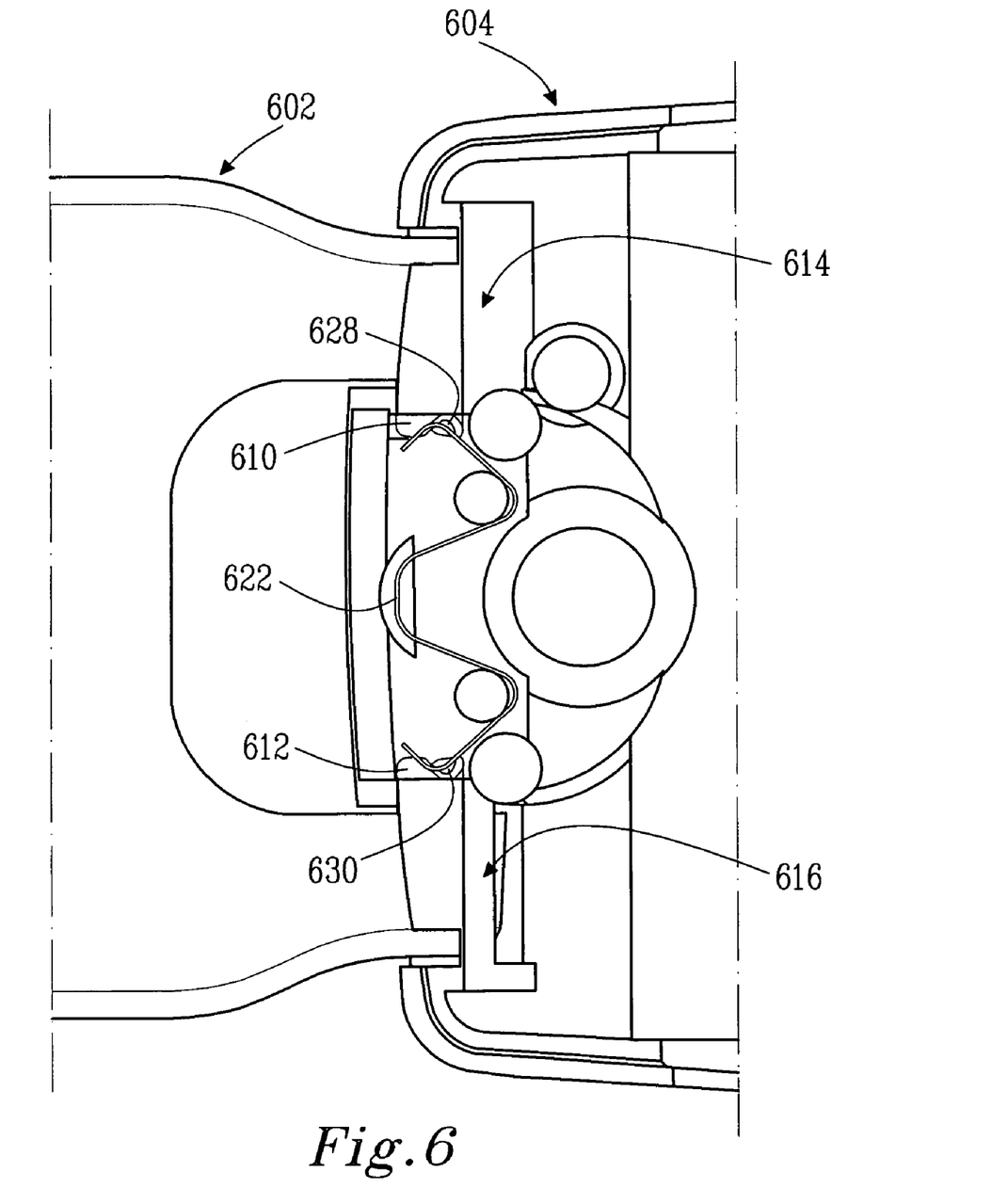
FIG. 6 shows the locking mechanism of a portable electronic device from below, with the flipping section folded in the first position according to some embodiments of the present invention.

FIG. 6 shows the locking mechanism of a portable electronic device, according to some embodiments of the present invention, from below having the flipping section 602 attached to the main section 604 which flipping section 602 is folded in the first position. As this figure shows some of the same features as FIGS. 2 and 3, the reference numerals provided in said two figures are applicable in this figure. For this reason some features present in FIG. 6 may not be explicitly referenced.

In FIG. 6, it is seen that the recessing track 628 of the first inner tap 610 does not fully mate with the plate spring 622 in the first locking arm-receiving area 614. In the same way it is seen that the recessing track 630 of the second inner tap 612 also does not fully mate with the plate spring 622 in the second locking arm-receiving area, 616. This absence of full mating of the tracks 628 and 630 with the plate spring 622 is due to the folded position of the flipping section 602 orienting the slopes of each track 628 and 630, respectively, in a position that does not allow fully mating with the provided plate spring 622 of the main section 604. In the first position of the flipping section 602, the plate spring 622 and the recessing tracks 628 and 630 can simply not fully mate.

However, due to the resilience of the plate spring 622, it acts on said mentioned slopes of each recessing track 628 and 630, such that the flipping section 602, via the first and second inner taps 610 and 612, respectively, changes its first position and acquires a different second position, in which the orientation of the slopes of said tracks 628 and 630, relative to the plate spring 622, is different.

Figure 7:
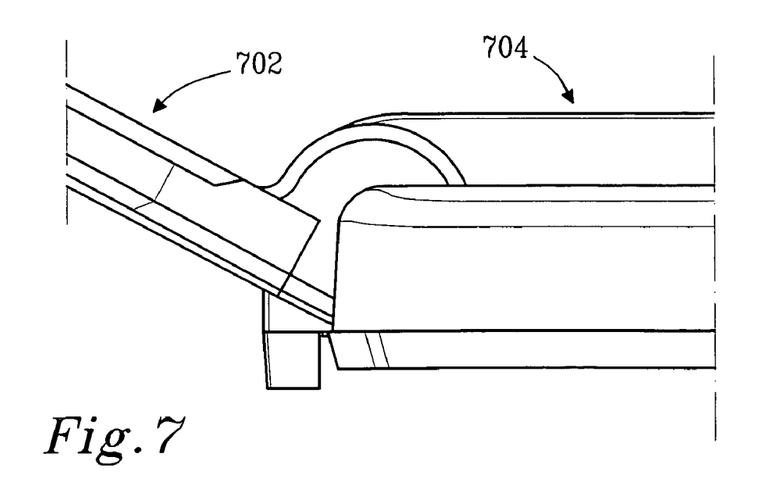
FIG. 7 is a side view of the locking mechanism of a portable electronic device with the flipping section folded in the second position, relative to the main section according to some embodiments of the present invention.

In FIG. 7 this second position of the flipping section 702 is shown relative to the main section 704 of the locking mechanism of the portable electronic device in accordance with some embodiments of the present invention.

Figure 8:
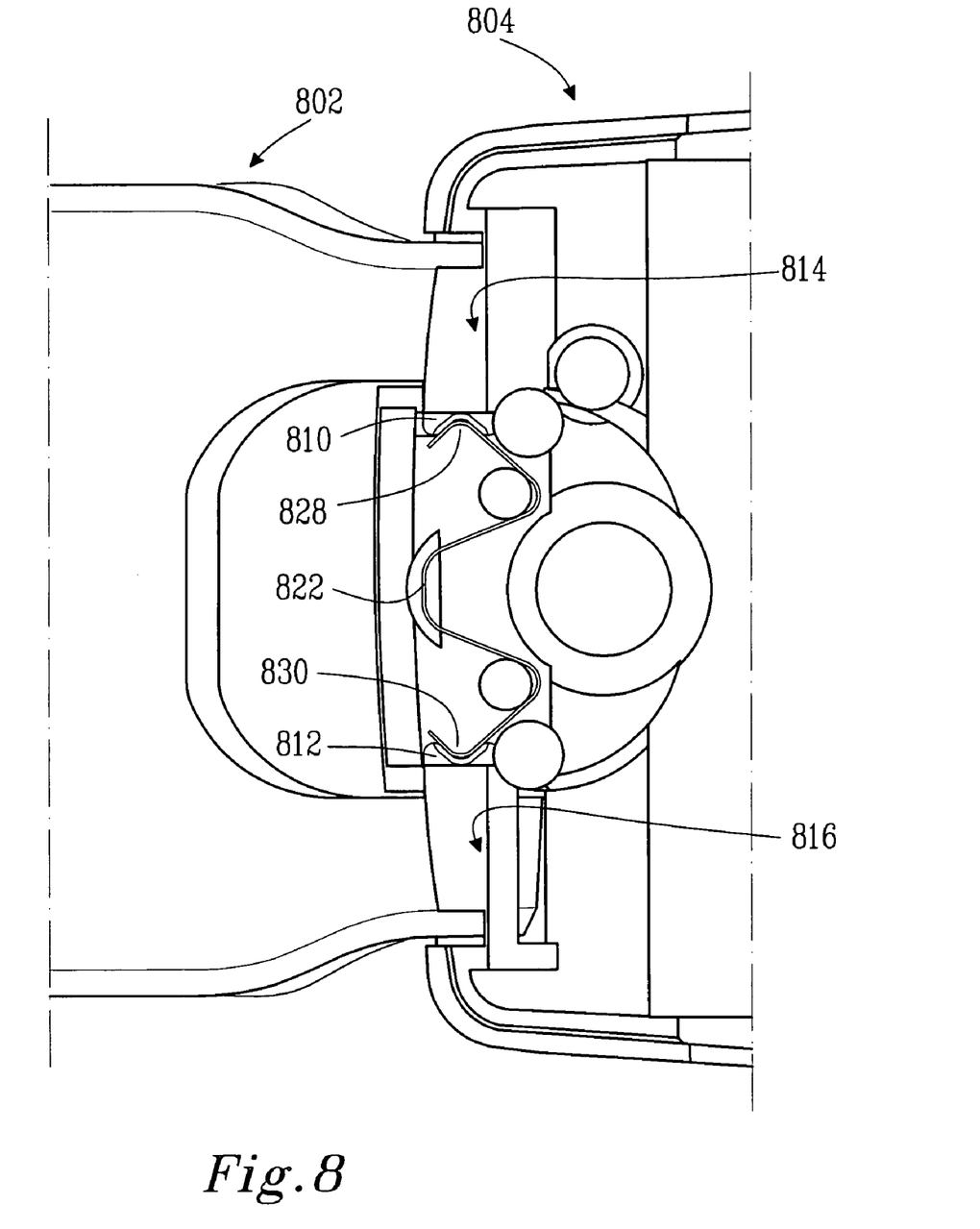
FIG. 8 is a view from below of the locking mechanism of a portable electronic device, showing the flipping section folded in the second position relative to the main section according to some embodiments of the present invention.

FIG. 8 is a view from below of a locking mechanism of a portable electronic device having the flipping section 802 still folded relative to the main section 804 in the second position, in accordance with some embodiments of the present invention. As this figure shows some of the same features as FIGS. 2 and 3, the reference numerals provided in said two figures are applicable in this figure. For this reason some features present in FIG. 8 may not be explicitly referenced in relation to this figure.

It can be seen in this second folded position of the flipping section 802 that the recessing track 828 of the first inner tap 810 and the recessing track 830 of the second inner tap 812 now fully mate with each other, in contrast to the relative orientation of the tracks 628 and 630 and the plate spring 622 in FIG. 6. The recessing tracks 828 and 830 of the flipping section 802 are hence aligned with the plate spring 822 in the first and second locking arm-receiving areas 814 and 816, respectively, of the main section 804 when the flipping section 802 is in the second position.

In FIG. 8, due to the resilience of this plate spring 822, this second position is a stable position, again in contrast to the first position of the flipping section 802, which is an unstable position, in which the plate spring 822 is urging the flipping section 802 to acquire said second position.

Moreover, considering the second inner and outer grooves or recesses 326 and 324, respectively, from FIG. 3, and the necessity of these grooves being anti-parallel with each other for the flipping section 302 to be detachable from and reattachable to the main section 304, it is understood that the change in orientation of the flipping section 802, relative to the main section 804, from the first to another position, for instance the second position, as exemplified in FIG. 8, further leads to that the flipping section 802 is neither detachable from or attachable to (when being detached) the main section 804 in this second position. Rather, the flipping section 802 is locked to the main section 804 such that it is not possible to detach.

Figure 9:
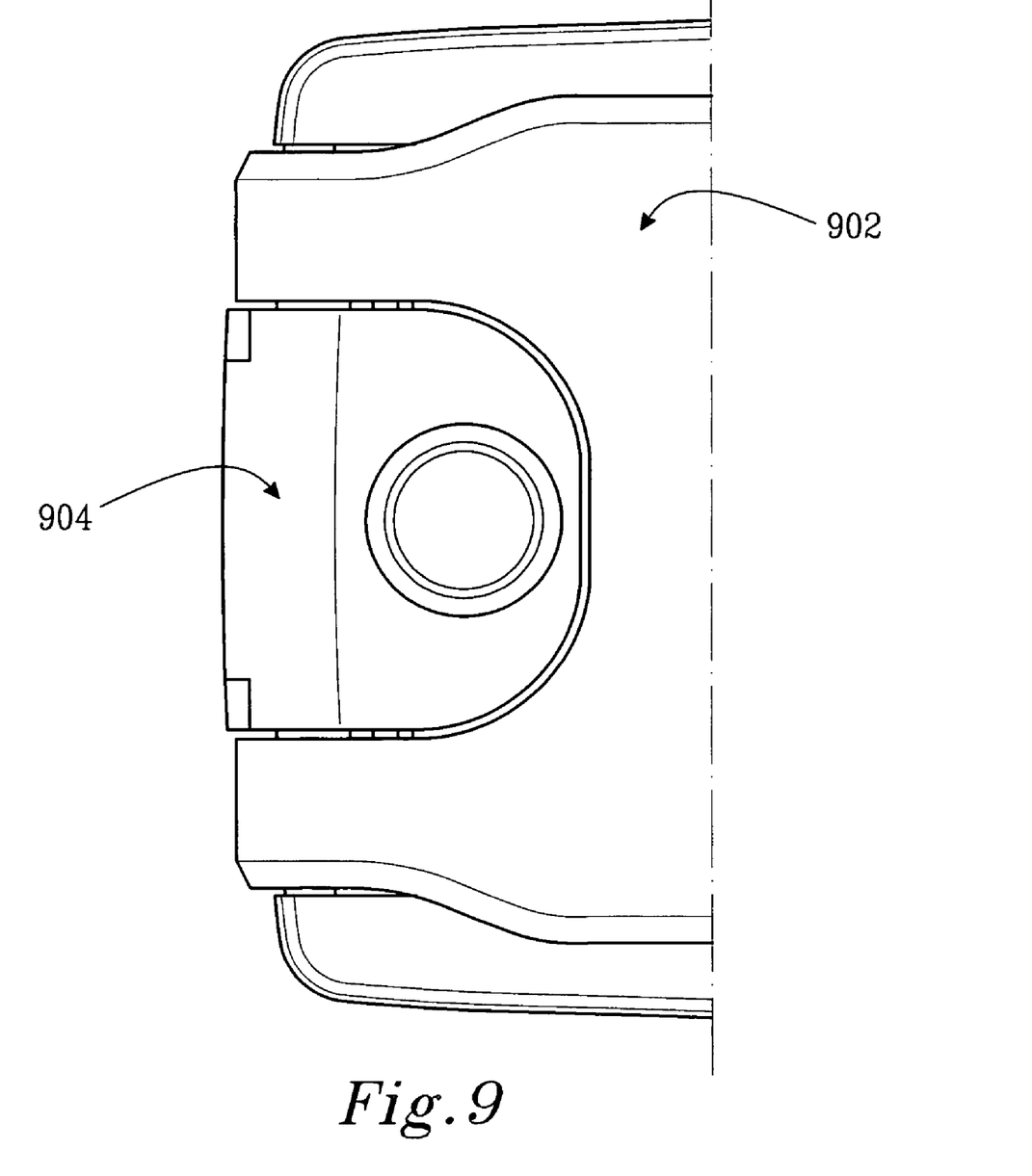
FIG. 9 shows the locking mechanism of a portable electronic device from above with the flipping section folded in a closed third position according to some embodiments of the present invention.

The flipping section can furthermore be folded in a closed third position, which position is acquired of the flipping section 902 relative to the main section 904 of the locking mechanism of a portable electronic device, according to some embodiments of the present invention, as shown in FIG. 9. This figure is a view from above showing the closed flipping section 902 on top of, and thereby at least part of, the main section, 904.

Figure 10:
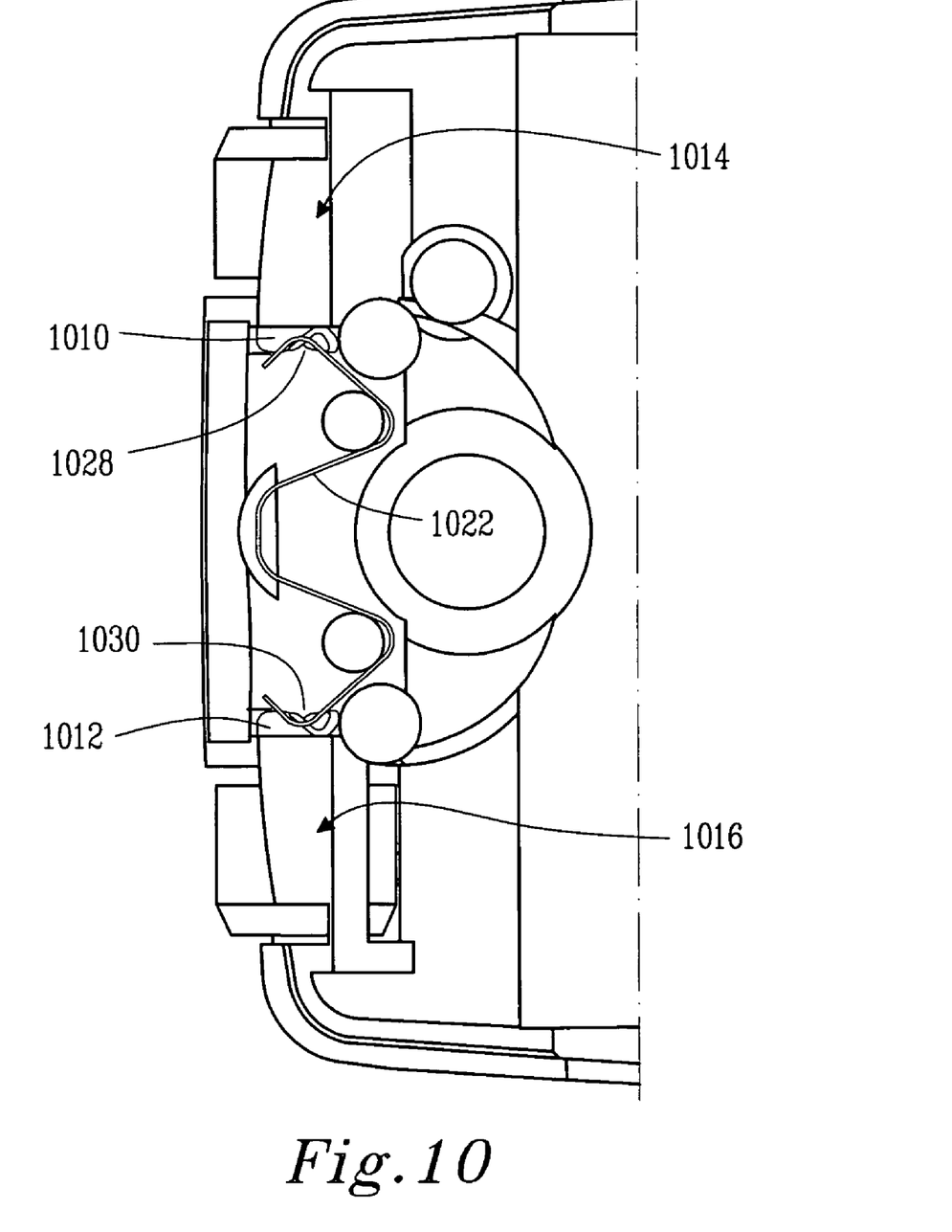
FIG. 10 is a view from below of said locking mechanism of a portable electronic device having the flipping section folded in the closed third position according to some embodiments of the present invention.

The locking mechanism of a portable electronic device having the flipping section 1002, oriented in the same closed third position is depicted in FIG. 10, in accordance with some embodiments of the present invention, is shown from below. As this figure shows some of the same features as FIGS. 2 and 3, the reference numerals provided in said two figures are applicable in this figure. For this reason some features present in FIG. 10 may not be explicitly referenced. However these can therefore be found in either FIG. 2 or 3.

It can be seen that the recessing track 1028 of the first inner tap 1010 again does not fully mate the plate spring 1022, in the first locking arm-receiving area 1014. The same is seen for the recessing track 1030, of the second inner tap 1012 in relation to the plate spring 1022 in the second locking arm-receiving area 1016. Due to non-alignment of these tracks 1028 and 1030 with the plate spring 1022, said plate spring 1022 again acts on the slopes of these recessing tracks 1028 and 1030 because of the resilience of said plate spring 1022. The orientation of the flipping section 1002 can not be changed as a result of this action of the plate spring 1022 unless mild force is applied because the third position is already the closed position of the flipping section 1002. However, this action performed by the plate spring 1022 prevents the flipping section 1002 from changing its position from the closed third position. Hence, the flipping section 1022 maintains on top of the main section, as for instance a covering element.

The force of the plate spring 1022, is small enough so that the user can easily fold and unfold the flipping section 1002 in the different positions, while it is large enough to urge said flipping section 1002 into either the second or third positions in absence of such force.

A locking mechanism having two locking arm-locking arm-receiving areas sets has been described above in accordance with some embodiments of the present invention. It is understood, however, that only one such locking arm locking arm-receiving area set is sufficient for gaining the advantages of the locking mechanism of the present invention. In each such locking arm-locking arm-receiving area set, an outer groove is arranged to mate an outer tap, and an inner groove is arranged to mate an inner tap, for instance the first outer groove being arranged to mate the first outer tap, and the first inner groove being arranged to mate the first inner tap.

Such locking arm-locking arm-receiving area set can be regarded as two locking combinations where each one of said two locking combinations contains one tap and one recess that are arranged to mate with each other. For this reason a nomenclature of, for instance, a first and a second locking mechanism can be used. The first locking mechanism intends either a locking mechanism comprising the first outer recess arranged to mate the first outer tap, or a locking mechanism comprising the second outer recess arranged to mate the second outer tap. The second locking mechanism is in the same way intended a locking mechanism comprising the first inner recess arranged to mate the first inner tap, or a locking mechanism comprising the second inner recess arranged to mate the second inner tap.

According to other embodiments of the present invention, the locking mechanism is provided with more than one resilient member or spring in either the main section of a portable electronic device, the flipping section, or both of the main section and the flipping section main of said device.

According to other embodiments of the present invention, the track provided in the tap is a protruding track that is arranged to align with a spring provided with a recess where said spring is provided in a recess that is arranged to mate with the tap. This means that the spring has a recessing track and the tap has a protrusion arranged to align with said recessing track or groove.

According to other embodiments of the present invention, the track is provided in a recess, which recess is arranged to mate a corresponding tap.

According to other embodiments of the present invention, the resilient member(s) act(s) on the outer locking combination(s).

According to other embodiments of the present invention, the outer tap of a locking combination is provided in the locking arm of the flipping section and the outer recess, arranged to mate said outer tap, is provided in the locking arm-receiving area of the main section.

According to other embodiments of the present invention, the inner tap of a locking combination is provided in the locking arm-receiving area of the main section, and the inner recess, arranged to mate with said inner tap, is provided in the locking arm of the flipping section.

According to other embodiments of the present invention, non-circularly shaped outer and/or inner taps are provided in the locking arm and/or the locking arm-receiving area by chamfering at least one side of said taps. Performing this chamfering perpendicularly to the rotational axis of the tap in question, that is on its envelope surface, and by orienting the resilient member arranged to mate the chamfered tap, such that it acts on the envelope surface of the tap, alternative embodiments of the locking mechanism according to the present invention may be obtained. Shaping at least part of one of said taps with an instance or two or three chamferings, thus obtaining planar areas on the envelope surface of said tap, for instance obtaining a triangular shape, two or three foldable positions of a flipping section are obtained, into which the resilient member or spring urges said flipping section.

According to other embodiments of the present invention, the flipping section is electrified by providing a trailing contact within a locking combination, via a groove and a tap, connecting the main section with the flipping section electrically.

A portable electronic device having a locking mechanism, according to some embodiments of the present invention, may have several advantages. For example, the flipping section of the portable electronic device may be easily detachable from and reattachable to the main section of said portable electronic device. The flipping section may be safely attached to the main section by the locking mechanism, unless mild force is applied by a user, when detaching the flipping section from the main section. The locking mechanism may have relatively few moving parts, and is therefore cheap, simple, and requires little space.

Many variations and modifications can be made to the preferred embodiments without substantially departing from the principles of the present invention. All such variations and modifications are intended to be included herein within the scope of the present invention, as set forth in the following claims.

That which is claimed:

1. A portable electronic device comprising:
    a main section with electronic circuitry;
    a detachable flipping section foldably mounted around an axis of rotation relative to said main section such that the flipping section can be folded in a first position wherein the flipping section is detachable and reattachable; and
    a locking mechanism provided with a resilient member, the resilient member being configured such that it orients, by action of the resilience of said member, the flipping section in a second position, the locking mechanism being further configured to prevent the flipping section from being detached from the main section within a position range comprising the second position; the locking mechanism further comprising:

a first locking combination comprising a first recess in the flipping section and a corresponding first tap in the main section; and a second locking combination comprising a second recess in the main section and a second corresponding tap in the flipping section;

wherein the resilient member acts on at least one of said two locking combinations, and both the first and second locking combinations are provided at said axis of rotation when the flipping section is attached to the main section.

2. A portable electronic device according to claim 1, wherein the recess of the first locking combination and the recess of the second locking combination are anti-parallel relative to each other in the first position, and at least one of the first and second taps and first and second recesses includes a track with which the resilient member is arranged to mate to provide the flipping section in the second position.

3. A portable electronic device according to claim 2, wherein in the first position the recesses are at least partially provided in a plane that comprises the axis of rotation around which the flipping section is foldable relative to the main section.

4. A portable electronic device according to claim 1, wherein the resilient member is provided in the main section.

5. A portable electronic device according to claim 2, wherein the track is provided in said second tap.

6. A portable electronic device, according to claim 1, wherein the flipping section can be folded in a third position in which the resilient member, by action of its resilience, urges the flipping section to cover at least part of the main section.

7. A portable electronic device according to claim 1, wherein the resilient member is a plate spring.

8. A portable electronic device according to claim 7, wherein the plate spring is made of a metal.

9. A portable electronic device according to claim 8, wherein the metal is spring steel.

10. A portable electronic device according to claim 7, wherein the plate spring is made of plastic.

11. A locking mechanism for holding and releasing a flipping section and a main section of a portable electronic device, the flipping section being detachably attached to a main section having electronic circuitry, the detachable flipping section being foldably mounted around an axis of rotation relative to said main section such that the flipping section can be folded in a first position wherein the flipping section is detachable and reattachable, the locking mechanism comprising:

a resilient member, the resilient member being configured such that it orients, by action of the resilience of said member, the flipping section in a second position, the locking mechanism being further configured to prevent the flipping section from being detached from the main section within a position range comprising the second position;

a first locking combination comprising a first recess in the flipping section and a corresponding first tap in the main section; and a second locking combination comprising a second recess in the main section and a second corresponding tap in the flipping section;

wherein the resilient member acts on at least one of said two locking combinations, and both the first and second locking combinations are provided at said axis of rotation when the flipping section is attached to the main section.

* * * * *